US008744716B2

(12) United States Patent
Kar et al.

(10) Patent No.: US 8,744,716 B2
(45) Date of Patent: Jun. 3, 2014

(54) SPEED CONTROL SYSTEMS AND METHODS FOR INTERNAL COMBUSTION ENGINES

(75) Inventors: Krishnendu Kar, South Lyon, MI (US); Michael Livshiz, Ann Arbor, MI (US); Christopher E. Whitney, Highland, MI (US); Cheryl A. Williams, Howell, MI (US); Etsuko Muraji Stewart, Laingsburg, MI (US); Matthew M. Manning, Brighton, MI (US)

(73) Assignee: GM Global Technology Operations LLC

( * ) Notice: Subject to any disclaimer, the term of this patent is extended or adjusted under 35 U.S.C. 154(b) by 884 days.

(21) Appl. No.: 12/748,851

(22) Filed: Mar. 29, 2010

(65) Prior Publication Data

US 2011/0139117 A1 Jun. 16, 2011

Related U.S. Application Data

(60) Provisional application No. 61/286,962, filed on Dec. 16, 2009.

(51) Int. Cl.
*B60W 30/182* (2012.01)
*B60W 30/18* (2012.01)

(52) U.S. Cl.
USPC ................ 701/84; 701/54; 701/110

(58) Field of Classification Search
USPC ............ 123/350, 436, 395, 480; 701/101, 54, 701/102, 110, 84; 180/65.21, 65.245, 65.25
See application file for complete search history.

(56) References Cited

U.S. PATENT DOCUMENTS

| | | | |
|---|---|---|---|
| 4,971,011 A | 11/1990 | Nanyoshi et al. | |
| 5,988,141 A | 11/1999 | Uchida | |
| 6,006,724 A | 12/1999 | Takahashi et al. | |
| 6,155,230 A | 12/2000 | Iwano et al. | |
| 6,178,371 B1 | 1/2001 | Light et al. | |
| 6,425,373 B1 | 7/2002 | Robichaux et al. | |
| 6,553,958 B1 | 4/2003 | Kolmanovsky et al. | |
| 6,704,638 B2 | 3/2004 | Livshiz et al. | |
| 6,705,285 B2 | 3/2004 | Yip et al. | |
| 6,959,691 B2 | 11/2005 | Ueda et al. | |
| 6,966,287 B1 | 11/2005 | Livshiz et al. | |
| 7,004,144 B2 | 2/2006 | Stroh et al. | |
| 7,021,282 B1 | 4/2006 | Livshiz et al. | |
| 7,367,290 B2 | 5/2008 | Chen et al. | |
| 7,463,970 B2 | 12/2008 | Livshiz et al. | |
| 7,698,048 B2 | 4/2010 | Jung et al. | |

(Continued)

OTHER PUBLICATIONS

U.S. Appl. No. 12/481,913, filed Jun. 10, 2009, Livshiz et al.

(Continued)

*Primary Examiner* — Mahmoud Gimie

(57) ABSTRACT

An engine control system includes a mode selection module that is configured to select an operating mode from one of an open loop control mode, a torque control mode, and a speed control mode based on an engine speed and a driver input. An axle torque arbitration (ABA) module generates ABA predicted and immediate torque requests based on the driver input. A speed control (SC) module generates a first set of SC predicted and immediate torque requests based on engine speed. A propulsion torque arbitration (PTA) module generates PTA predicted and immediate torque requests based on one of the ABA predicted and immediate torque requests and the first set of SC predicted and immediate torque requests based on the operating mode. A torque output control module controls output torque of an engine based on the PTA predicted and immediate torque requests.

20 Claims, 10 Drawing Sheets

(56) References Cited

U.S. PATENT DOCUMENTS

| | | |
|---|---|---|
| 2001/0037793 A1 | 11/2001 | Robichaux et al. |
| 2003/0075147 A1 | 4/2003 | Kowatari et al. |
| 2004/0210377 A1 | 10/2004 | Cullen |
| 2005/0065705 A1 | 3/2005 | Hartmann et al. |
| 2005/0274357 A1 | 12/2005 | Matthews et al. |
| 2008/0243355 A1 | 10/2008 | Whitney et al. |
| 2009/0118977 A1 | 5/2009 | Whitney et al. |
| 2009/0173314 A1 | 7/2009 | Whitney et al. |
| 2009/0241899 A1 | 10/2009 | Whitney et al. |
| 2009/0276128 A1 | 11/2009 | Whitney et al. |
| 2009/0276137 A1* | 11/2009 | Whitney et al. ............... 701/101 |
| 2010/0057329 A1 | 3/2010 | Livshiz et al. |
| 2011/0195817 A1 | 8/2011 | Whitney et al. |

OTHER PUBLICATIONS

U.S. Appl. No. 12/535,950, filed Aug. 5, 2009, Whitney et al.

\* cited by examiner

SPEED CONTROL SYSTEMS AND METHODS FOR INTERNAL COMBUSTION ENGINES

CROSS-REFERENCE TO RELATED APPLICATIONS

This application claims the benefit of U.S. Provisional Application No. 61/286,962, filed on Dec. 16, 2009. The disclosure of the above application is incorporated herein by reference in its entirety.

FIELD

The present invention relates to engine control systems and more particularly to coordinated torque control and engine speed control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine (ICE) combusts an air/fuel mixture within cylinders to drive pistons, which produces drive torque. Air flow into an ICE engine may be regulated via a throttle and adjustment in throttle area. Adjustment in throttle area alters air flow into the ICE. As the throttle area increases, the air flow into the engine increases. Fuel injection rate is adjusted in addition to adjustment in air flow to provide the air/fuel mixture. Increasing the amount of air and fuel provided to cylinders of the ICE increases torque output of the ICE. Engine control systems have been developed to control engine torque output.

Engine control systems have been developed to control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect the engine torque output.

SUMMARY

An engine control system is provided and includes a mode selection module. The mode selection module is configured to select an operating mode from one of an open loop control mode, a torque control mode, and a speed control mode based on an engine speed and a driver input. An axle torque arbitration (ABA) module generates ABA predicted and immediate torque requests based on the driver input. A speed control (SC) module generates a first set of SC predicted and immediate torque requests based on engine speed. A propulsion torque arbitration (PTA) module generates PTA predicted and immediate torque requests based on one of the ABA predicted and immediate torque requests and the first set of SC predicted and immediate torque requests based on the operating mode. A torque output control module controls output torque of an engine based on the PTA predicted and immediate torque requests.

In other features, a method of operating an engine control system is provided. The method includes selecting an operating mode from one of an open loop control mode, a torque control mode, and a speed control mode based on an engine speed and a driver input. ABA predicted and immediate torque requests are generated based on the driver input. A first set of SC predicted and immediate torque requests are generated based on engine speed. PTA predicted and immediate torque requests are generated based on one of the ABA predicted and immediate torque requests and the first set of SC predicted and immediate torque requests based on the operating mode. Output torque of an engine is controlled based on the PTA predicted and immediate torque requests Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
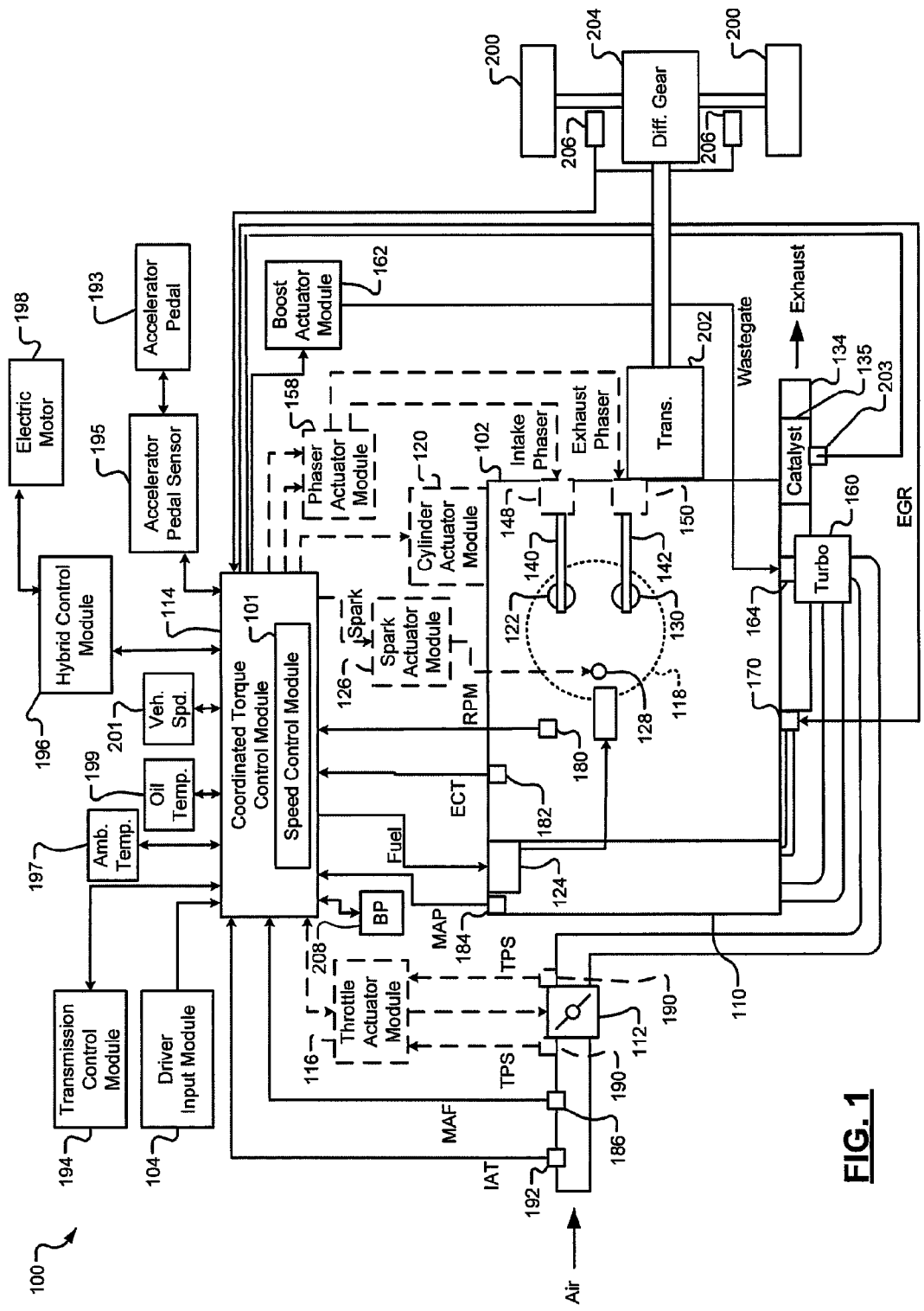
FIG. 1 is a functional block diagram of a coordinated torque control (CTC) system incorporating a speed control module in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke. The four-strokes are repeated during operation of the engine.

In addition, although the following embodiments are described primarily with respect to example internal combustion engines, the embodiments of the present disclosure may apply to other internal combustion engines. For example, the present invention may apply to gasoline, diesel, compression ignition, spark ignition, homogenous spark ignition, homogeneous charge compression ignition, stratified spark ignition, and spark assisted compression ignition engines.

Coordinated torque control systems may operate based on various torque parameters, such as unmanaged torque, predicted torque, immediate torque and reserve torque levels. Unmanaged torque refers to torque provided when spark is at a minimum level for best output torque. Immediate torque can be calculated base on the unmanaged torque. Predicted torque and immediate torque are further defined below. The reserve torque of the coordinated torque control systems may be set equal a difference between the unmanaged torque and the immediate torque. Due to the dependency on unmanaged torque and since the unmanaged torque is affected by intake manifold delay, the reaction time of the coordinated torque control systems to changes in engine speed can be considerable (high relative to the speed control techniques described below). The unmanaged torque can be higher or lower than the predicted torque due to the manifold delay. Also, immediate torque can as a result remain at a high level or at a low level for an extended period (hang high or hang low).

A speed control algorithm and corresponding module are provided herein that includes determination of immediate torque. The immediate torque is not based on unmanaged torque. This reduces torque reserve levels and increases fuel economy. In accordance with the speed control algorithm, torque reserve at steady state is set equal to a difference between predicted and immediate torque requests.

Different engine speed control algorithms can be provided for different engine control systems, such as for gasoline, diesel, hybrid, homogenous charge compression ignition (HCCI), lean gas, and other engine control systems. The speed control algorithm and module provided herein may be used by different engine control systems and associated actuators. This reduces duplication of efforts in developing, testing and operating different engine control systems.

Referring now to FIG. 1, a functional block diagram of a CTC system 100 that incorporates a speed control module is shown. The CTC system 100 is a hybrid powertrain control system and may be configured for a non-hybrid vehicle and/or a hybrid electric vehicle. Although the CTC system 100 is primarily described with respect to a gasoline-based configuration, the CTC system 100 may be configured for a spark ignition direction injection (SIDI) engine, a hybrid engine, a HCCI engine, and/or a diesel engine. An example diesel configuration is described below.

The CTC system 100 includes an engine 102 that combusts an air/fuel mixture to produce drive torque for a vehicle based on a driver input module 104. Air is drawn into an intake manifold 110 through a throttle valve 112. A CTC module 114, which may be referred to as an engine control module, commands a throttle actuator module 116 to regulate opening of the throttle valve 112 to control the amount of air drawn into the intake manifold 110. In a diesel configuration, the throttle actuator module 116 may regulate opening of the throttle based on a signal from an exhaust gas recirculation (EGR) module. In the diesel configuration, the throttle valve 112 may remain in a fully open state and torque output may be adjusted by adjusting fuel quantities. The CTC module 114 includes the speed control module 101, which adjusts engine speed by adjusting torque predicted and torque immediate request signals.

Air from the intake manifold 110 is drawn into cylinders of the engine 102. The engine 102 may include any number of cylinders. The CTC module 114 may instruct a cylinder actuator module 120 to selectively deactivate some of the cylinders to improve fuel economy.

Air from the intake manifold 110 is drawn into the cylinder 118 through an intake valve 122. The CTC module 114 controls the amount of fuel injected by a fuel injection system 124 that includes one or more fuel injectors 125. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders, as shown.

The injected fuel mixes with the air and creates the air/fuel mixture in the cylinder 118. A piston (not shown) within the cylinder 118 compresses the air/fuel mixture. Based upon a signal from the CTC module 114, a spark actuator module 126 may be included and energize a spark plug 128 in the cylinder 118, which ignites the air/fuel mixture. The timing of the spark may be specified relative to the crankshaft angle when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. Exhaust passes through a catalyst 135.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

A CTC module 114 may regulate the position of the intake valve 122 and/or the exhaust valve 130 to regulate the quantity of air ingested and inert residual gases retained in the cylinder(s) 118. The CTC module 114 may also adjust operation of the fuel injector(s) 125, such as ON time or size of injector openings, to increase the amount of fuel injected into the cylinder(s) 118. The CTC module 114 may also adjust the timing of the exhaust camshaft(s) corresponding to the change in the A/F mixture.

The crankshaft angle at which the intake valve 122 is opened may be varied with respect to piston TDC by an intake cam phaser 148. The crankshaft angle at which the exhaust valve 130 is opened may be varied with respect to piston TDC by an exhaust cam phaser 150. A phaser actuator module 158 controls the intake cam phaser 148 and the exhaust cam phaser 150 based on signals from the CTC module 114.

The CTC system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The CTC module 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The CTC system 100 may include an EGR valve 170, which selectively redirects exhaust gas back to the intake manifold 110. In various implementations, the EGR valve 170 may be located after the turbocharger 160. The CTC system 100 may measure the speed of the crankshaft in revolutions per minute (RPM) using an engine speed sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. The MAF sensor 186 may be located in a housing that includes the throttle valve 112.

The throttle actuator module 116 may monitor the position of the throttle valve 112 using one or more throttle position sensors (TPS) 190. The ambient temperature of air being drawn into the CTC system 100 may be measured using an intake air temperature (IAT) sensor 192. The CTC module 114 may use signals from the sensors to make control decisions for the CTC system 100.

The CTC module 114 may communicate with a transmission control module 194 to coordinate shifting gears in a transmission (not shown). For example, the CTC module 114 may reduce torque during a gear shift. The CTC module 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the CTC module 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is an amount of spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phase angles, air/fuel ratio, and number of cylinders activated, respectively.

While electric motor 198 may provide torque in series and/or in parallel with the torque output of engine 102, it should be appreciated that other configurations are also contemplated to be within the scope of this description. For example, electric motor 198 may be implemented as one or more electric motors that provide torque directly to wheels 200 instead of passing through a transmission 202.

The combined torque of engine 102 and electric motor 198 is applied to an input of transmission 202. Transmission 202 may be an automatic transmission that switches gears in accordance with a gear change command from the CTC module 114. An output shaft of transmission 202 is coupled to an input of a differential gear 204. Differential gear 204 drives axles and wheels 200. Wheel speed sensors 206 generate signals that indicate a rotation speed of their respective wheels 200.

The CTC module 114 estimates an engine output torque to provide based on received sensor signals and other parameters described herein. The CTC module 114 may adjust position of the throttle, air-fuel ratio, valve timing, fuel injection, etc. to provide the estimated engine output torque. Based on a desired engine output torque, the CTC module 114 controls engine devices such that a desired air flow, a desired fuel injection, and/or a desired spark timing is achieved. The desired engine output torque may be based on a vehicle operator (driver) request and/or may be controller based, such as a torque output request from a cruise control system. In particular, the CTC module 114 controls the torque output of the engine based on the coordinated torque control methods and systems of the present disclosure.

The sensor signals that are received by the CTC module 114 may include sensor signals from: the MAP sensor 184, the MAF sensor 186, the throttle position sensor 190, the IAT sensor 192, an accelerator pedal position sensor 195, or other sensors, such as the engine coolant temperature sensor 182, the engine speed sensor 180, an ambient temperature sensor 197, an oil temperature sensor 198, and a vehicle speed sensor 201, an exhaust or catalyst temperature sensor 203.

The CTC module 114 communicates with the throttle actuator module 116 and a cruise control module. The CTC module 114 receives a throttle position signal from the throttle position sensor 190 and adjusts throttle position based on the throttle position signal. The CTC module 114 may control the throttle 112 using a throttle actuator based on a position of an accelerator pedal 193. The throttle actuator module 116 may include a motor or a stepper motor, which provides limited and/or coarse control of the throttle position.

The CTC module 114 may also control the throttle 112 using the throttle actuator based on input from the cruise control module, such as an axle torque request. The CTC module 114 also generates an effective pedal position signal Pedal, which represents a throttle position regardless of whether the vehicle operator is depressing the accelerator pedal 194 or the cruise control module is controlling the amount of throttle.

Air mass, volume, and pressure per cylinder may be determined and/or estimated based on signals from the sensors 184, 186. The CTC control module 114 may determine a throttle area based on a desired MAP and a desired MAF, and may generate a control signal to control the throttle based on the throttle area. The desired MAP and MAF may be determined based on engine speed and torque request signals.

The engine system 100 may further include a barometric pressure sensor 208. The barometric pressure sensor 208 may be used to determine environmental conditions, which may be further used to determine a desired throttle area. The desired throttle area may correspond to a specific throttle position.

The CTC system 100 may be modified for diesel applications. For example, in a diesel configuration certain items, such as the throttle actuator module 116, cylinder actuator module 120, spark actuator module 126, spark plug 128, camshaft phasers 148, 150, phaser actuator module 158, and throttle position sensors 190 may function differently or may not be included, which are dashed items in FIG. 1. In the diesel configuration the throttle actuator module may primarily maintain the throttle 112 in a fully open position.

Figure 2:
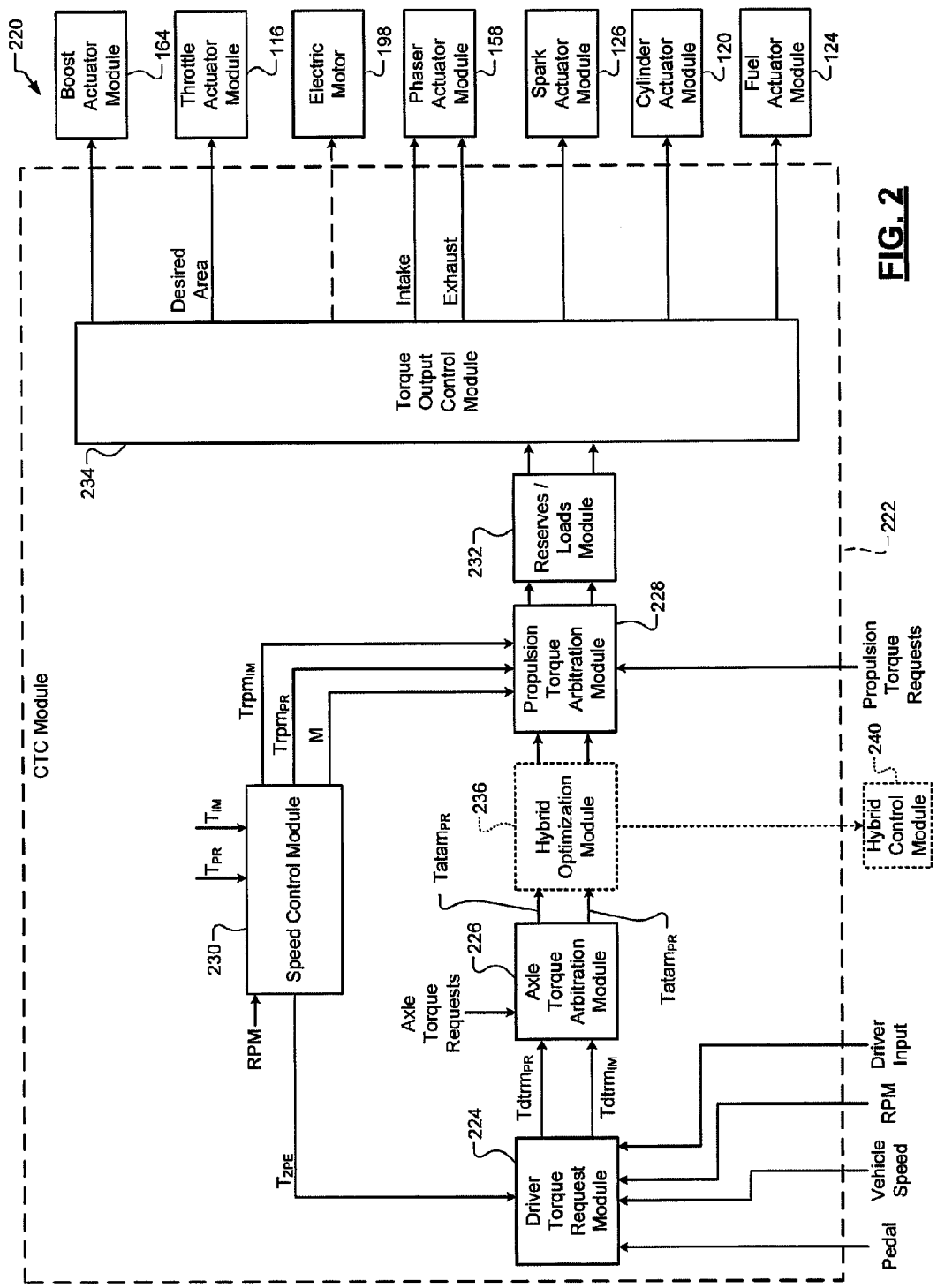
FIG. 2 is a functional block diagram of a gasoline-based CTC system in accordance with an embodiment of the present disclosure.

Referring now to FIG. 2, a functional block diagram of a gasoline-based CTC system 220 is presented. The CTC system 220 is a hybrid powertrain control system and may be part of the CTC system 100. An exemplary implementation of a CTC module 222 includes a driver torque request module 224, an axle torque arbitration module 226, a propulsion torque arbitration module 228, a speed control module 230, a reserves and loads module 232 and a torque output control module 234.

The driver torque request module 224 generates predicted and immediate torque request signals $Tdtrm_{PR}$, $Tdtrm_{IM}$ based on received engine speed RPM, vehicle speed, pedal position Pedal, driver requests or inputs and zero pedal torque $T_{ZPE}$. The zero pedal torque $T_{PE}$ is generated by the seed control module 230 and is equal to creep coast torque (friction torque) $T_F$ plus transmission load torque $T_{TL}$. The zero pedal torque $T_{PE}$ is determined when the accelerator pedal 193 is not "tipped in" (zero tip in) or at a non-actuated state. The driver input may be based on the position of the accelerator pedal Pedal. The driver input may also be based on cruise control, which may be an adaptive cruise control that maintains a predetermined following distance.

The axle torque arbitration module 226 may directly receive the driver input and/or may arbitrate between the predicted and immediate torque request signals $Tdtrm_{PR}$, $Tdtrm_{IM}$ and other axle torque requests. Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle overspeed torque requests may reduce the engine torque output to prevent the vehicle from exceeding a predetermined speed. Axle torque requests may also be made by body stability control systems. Axle torque requests may further include engine cutoff requests, such as may be generated when a critical fault is detected.

The axle torque arbitration module 226 outputs a predicted torque $Tatam_{PR}$ and an immediate torque $Tatam_{IM}$ based on the driver input and/or the results of arbitrating between the received torque requests. The predicted torque $Tatam_{PR}$ is the amount of torque that the CTC module 222 prepares to generate, and may often be based on the driver's torque request. The immediate torque $Tatam_{IM}$ is the amount of currently desired torque, which may be less than the predicted torque $Tatam_{PR}$. The immediate torque $Tatam_{IM}$ may be less than the predicted torque $Tatam_{PR}$ to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque $Tatam_{IM}$ may be achieved by varying engine actuators that respond quickly, while slower engine actuators may be used to prepare for the predicted torque $Tatam_{PR}$. The actuators associated with air flow and camshaft phaser angle adjustment are considered slow relative to the time required to adjust spark timing. For example, spark advance may be adjusted quickly, while the airflow response to cam phaser position and throttle changes may be slower to respond because changes in air flow are subject to air transport delays in the intake manifold. In addition, changes in air flow are not manifested as torque variations until air has been drawn into a cylinder, compressed, and combusted.

A torque reserve $T_R$ may be created by setting slower engine actuators to produce a predicted torque, while setting faster engine actuators to produce an immediate torque that is less than the predicted torque. For example, a throttle valve can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve $T_R$, as opposed to a difference between an unmanaged torque $T_U$ and the immediate torque. When a torque reserve is present, the engine output torque can be quickly increased from the immediate torque to the predicted torque by changing a faster actuator. The predicted torque is thereby achieved without waiting for a change in torque to result from an adjustment of one of the slower actuators.

The axle torque arbitration module 226 outputs the predicted torque $Tatam_{PR}$ and the immediate torque $Tatam_{IM}$ to a propulsion torque arbitration module 228. In various implementations, the axle torque arbitration module 226 may output the predicted torque $Tatam_{PR}$ and immediate torque $Tatam_{IM}$ to a hybrid optimization module 236. The hybrid optimization module 236 determines how much torque should be produced by an engine and how much torque should be produced by an electric motor. The hybrid optimization module 236 then outputs modified predicted and immediate torque values to the propulsion torque arbitration module 228. In various implementations, the hybrid optimization module 236 may be implemented in a hybrid control module (HCM) 240.

In addition to the predicted and immediate torque signals received from the axle torque arbitration module 226 or from the hybrid optimization module 226, the propulsion torque arbitration module 228 also receives predicted and immediate torque signals $Trpm_{PR}$, $Trpm_{IM}$ from the speed control module 230.

The speed control module 230 generates the predicted and immediate torque signals $Trpm_{PR}$, $Trpm_{IM}$ based on an engine speed signal RPM. The speed control module 230 may generate current predicted and immediate torque signals $Trpm_{PR}$, $Trpm_{IM}$ based on previous predicted and immediate torque signals $Trpm_{PR}$, $Trpm_{IM}$ and/or based on other predicted and immediate torque signals, designated $T_{PR}$, $T_{IM}$. The other predicted and immediate torque signals may be predicted and immediate torque signals generated by, for example, the propulsion torque arbitration module 228 and/or the reserves/load module 232.

The propulsion torque arbitration module 228 operates in a torque control mode and a speed control mode. The propulsion torque arbitration module 228 selects the predicted and immediate torque signals $Tatam_{PR}$, $Tatam_{IM}$ when operating in the torque control mode. The propulsion torque arbitration module 228 selects the predicted and immediate torque signals $Trpm_{PR}$, $Trpm_{IM}$ when operating in the speed control mode.

The propulsion torque arbitration module 228 converts the predicted and immediate torques $Tatam_{PR}$, $Tatam_{IM}$ or the predicted and immediate torques $Trpm_{PR}$, $Trpm_{IM}$ from an axle torque domain (torque at the wheels) into a propulsion torque domain (torque at the crankshaft) based on a mode signal M. The mode signal M may be generated by the speed control module 230 and indicates whether the torque control mode or the speed control mode is activated. This conversion may occur before, after, as part of, or in place of the hybrid optimization module 236.

The propulsion torque arbitration module 228 arbitrates between propulsion torque requests, including the converted predicted and immediate torques. The propulsion torque arbitration module 228 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by a TCM to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine without regard to torque. The propulsion torque arbitration module 228 may still receive these shutoff requests so that, for example, appropriate data can be fed back to other torque requestors. For example, all other torque requestors may be informed that they have lost arbitration. The propulsion torque arbitration module 228 may receive predicted and immediate torque requests from a RPM control module, such as the RPM control module of FIG. 4.

A reserves/loads module 232 receives the arbitrated predicted and immediate torque requests from the propulsion torque arbitration module 228. Various engine operating conditions may affect the engine torque output. In response to these conditions, the reserves/loads module 232 may create a torque reserve by increasing the predicted torque request.

For example only, a catalyst light-off process or a cold start emissions reduction process may require retarded spark advance for an engine. The reserves/loads module 232 may therefore increase the predicted torque request above an immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Corresponding torque reserves may be made to increase torque quickly to offset the decreasing changes in the engine torque output due to enleaning fuel during these processes.

The reserves/loads module 232 may also create a reserve in anticipation of a future load, such as the engagement of the air conditioning compressor clutch or power steering pump operation. The reserve for A/C clutch engagement may be created when the driver first requests air conditioning. Then, when the A/C clutch engages, the reserves/loads module 232 may add the expected load of the A/C clutch to the immediate torque request.

The torque output control module 234 receives the predicted and immediate torque requests from the reserves and loads module 232. The torque output control module 234 determines how the predicted and immediate torque requests will be achieved. The torque output control module 234 may be engine type specific, with different control schemes for gas engines versus diesel engines. In various implementations, the torque output control module 234 may define the boundary between modules that are engine independent and modules that are engine dependent. The output torque control module 234 may control the electric motor 198.

For example, in a gas engine, the torque output control module 234 may vary the opening of the throttle valve, which allows for a wide range of torque control. However, opening and closing the throttle valve results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the torque output control module 234 may generate an air torque request based on the predicted torque request. The air torque request may be equal to the predicted torque request, causing air flow to be set so that the predicted torque request can be achieved simply by changes to other actuators.

The torque output control module 234 may determine desired actuator values for slow actuators based on the air torque request. For example, the torque output control module 234 may control desired manifold absolute pressure (MAP), desired throttle area, and/or desired air per cylinder (APC). Desired MAP may be used to determine desired boost, and desired APC may be used to determine desired cam phaser positions.

In gasoline systems, the torque output control module 234 may also generate a spark torque request, a cylinder shut-off torque request, and a fuel mass torque request. The spark torque request may be used by the torque output control module 234 to determine how much to retard the spark (which reduces the engine torque output) from a calibrated spark advance. The torque output control module 234 controls the spark actuator module 126. In diesel systems, fuel mass may be the primary actuator for controlling engine torque output.

The cylinder shut-off torque request may be used by the torque output control module 234 to determine how many cylinders to deactivate. The torque output control module 234 may instruct the cylinder actuator module 120 to deactivate one or more cylinders of the engine 102. In various implementations, a predefined group of cylinders may be deactivated jointly. The torque output control module 234 may instruct the fuel actuator module 124 to stop providing fuel for deactivated cylinders and may instruct the spark actuator module 126 to stop providing spark for deactivated cylinders.

The fuel mass torque request may be used by the torque output control module 234 to vary the amount of fuel provided to each cylinder. For example only, the torque output control module 234 may determine a fuel mass that, when combined with the current amount of air per cylinder, yields stoichiometric combustion. The torque output control module 234 may instruct the fuel actuator module 124 to inject this fuel mass for each activated cylinder. During normal engine operation, the torque output control module 234 may attempt to maintain a stoichiometric air/fuel ratio.

The torque output control module 234 may increase the fuel mass above the stoichiometric value to increase engine torque output and may decrease the fuel mass to decrease engine torque output. In various implementations, the torque output control module 234 may receive a desired air/fuel ratio that differs from stoichiometry. The torque output control module 234 may then determine a fuel mass for each cylinder that achieves the desired air/fuel ratio.

The torque output control module 234 may estimate torque output of the engine. This estimated torque may be used to perform closed-loop control of engine air flow parameters, such as MAP, throttle area, and phaser positions. For example only, a torque relationship such as that of equation 1 may be defined, where torque (T) is a function of air per cylinder (APC), spark advance (S), intake cam phaser position (I), exhaust cam phaser position (E), air/fuel ratio (AF), oil temperature (OT), and number of activated cylinders (#).

$$T = f(APC, S, I, E, AF, OT, \#) \quad (1)$$

Additional variables may be accounted for, such as the degree of opening of an exhaust gas recirculation (EGR) valve.

This relationship may be modeled by an equation and/or may be stored as a lookup table. The torque output control module 234 may determine APC based on measured MAF and current RPM, thereby allowing closed loop air control based on actual air flow. This estimated torque may be referred to as an air torque (i.e., an estimate of how much torque could be generated at the current air flow, regardless of the actual engine torque output, which varies based on spark advance).

The torque output control module 234 may generate a desired manifold absolute pressure (MAP) signal, which is used to control the boost actuator module 164. The boost actuator module 164 then controls one or more turbochargers and/or superchargers.

The torque output control module 234 may generate a desired area signal, which is output to the throttle actuator module 116. The throttle actuator module 116 then regulates the throttle valve to produce the desired throttle area. The torque output control module 234 may use the estimated torque and/or the MAF signal in order to perform closed loop control. For example, the desired area signal may be controlled based on a comparison of the estimated torque and the air torque request. The torque output control module 234 may also generate a desired air per cylinder (APC) signal, which is used with the RPM signal to control positions of the intake and/or exhaust cam phasers using the phaser actuator module 158.

MBT refers to the maximum torque that is generated for a given air flow as spark advance is increased, while using fuel having an octane rating greater than a predetermined threshold. The spark advance at which this maximum torque occurs may be referred to as MBT spark. Calibrated spark advance may differ from MBT spark because of, for example, fuel quality and environmental factors. The torque at the calibrated spark advance may therefore be less than MBT.

Figure 3:
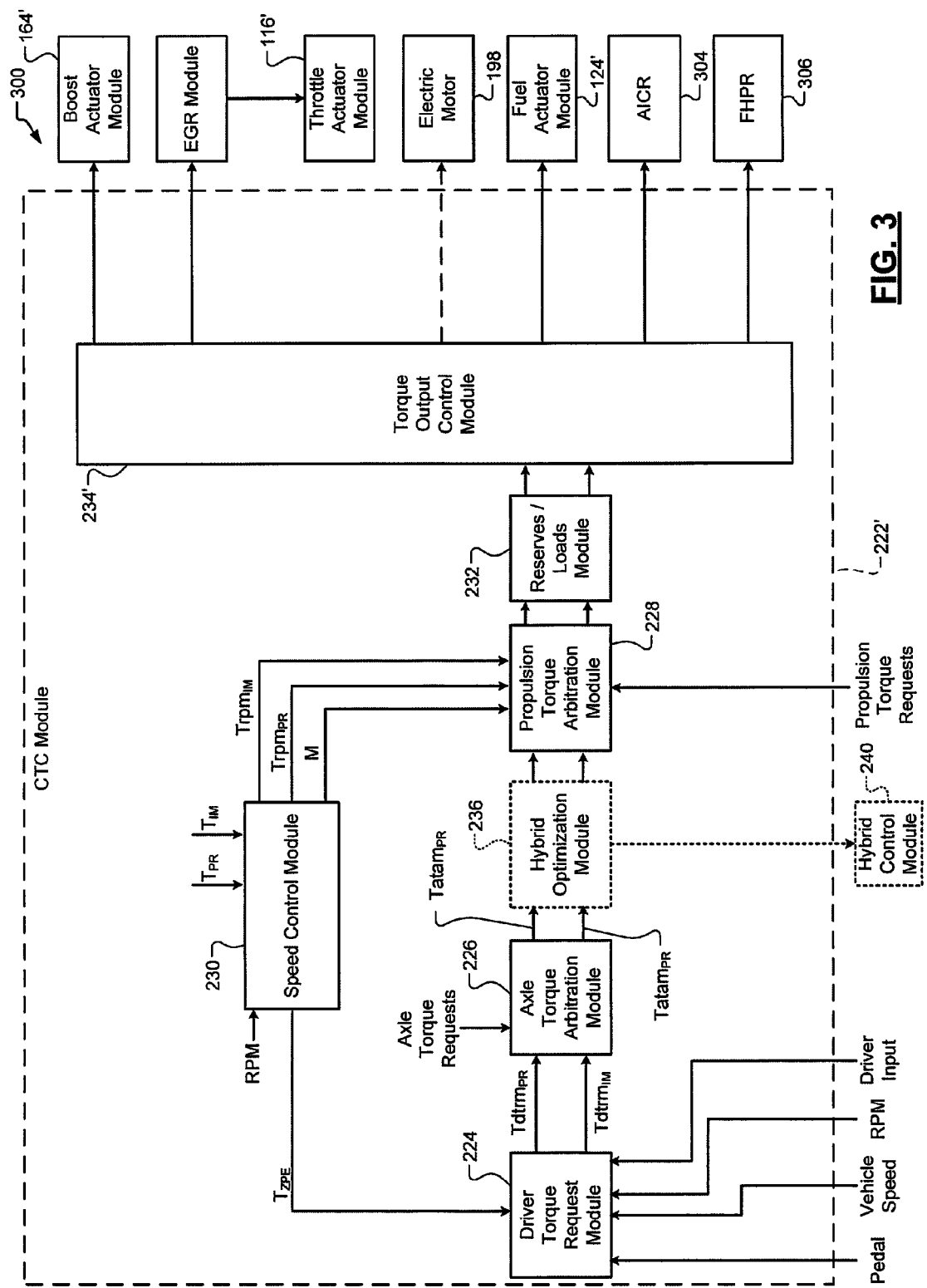
FIG. 3 is a functional block diagram of a diesel-based CTC system in accordance with an embodiment of the present disclosure.

In FIG. 3, a functional block diagram of a diesel-based CTC system 300 is shown. The diesel-based CTC system 300 is a hybrid powertrain control system. The diesel-based CTC system 300 includes a CTC control module 220'. The CTC control module 220' includes the driver torque request module 224, the axle torque arbitration module 226, the propulsion torque arbitration module 228, the speed control module 230, the reserves and loads module 232, and an output torque control module 234'. The CTC control module 220' may include the hybrid optimization module 236, which communicates with the hybrid control module 240.

The output torque control module 234' controls a boost actuator module 164', an EGR module 302, a fuel actuator module 124', an air-conditioning control module AICR 304, and a fuel high pressure ring module FHPR 306. The EGR module 302 may control a throttle actuator module 116'. The output torque control module 234' may control the electric motor 198.

Figure 4:
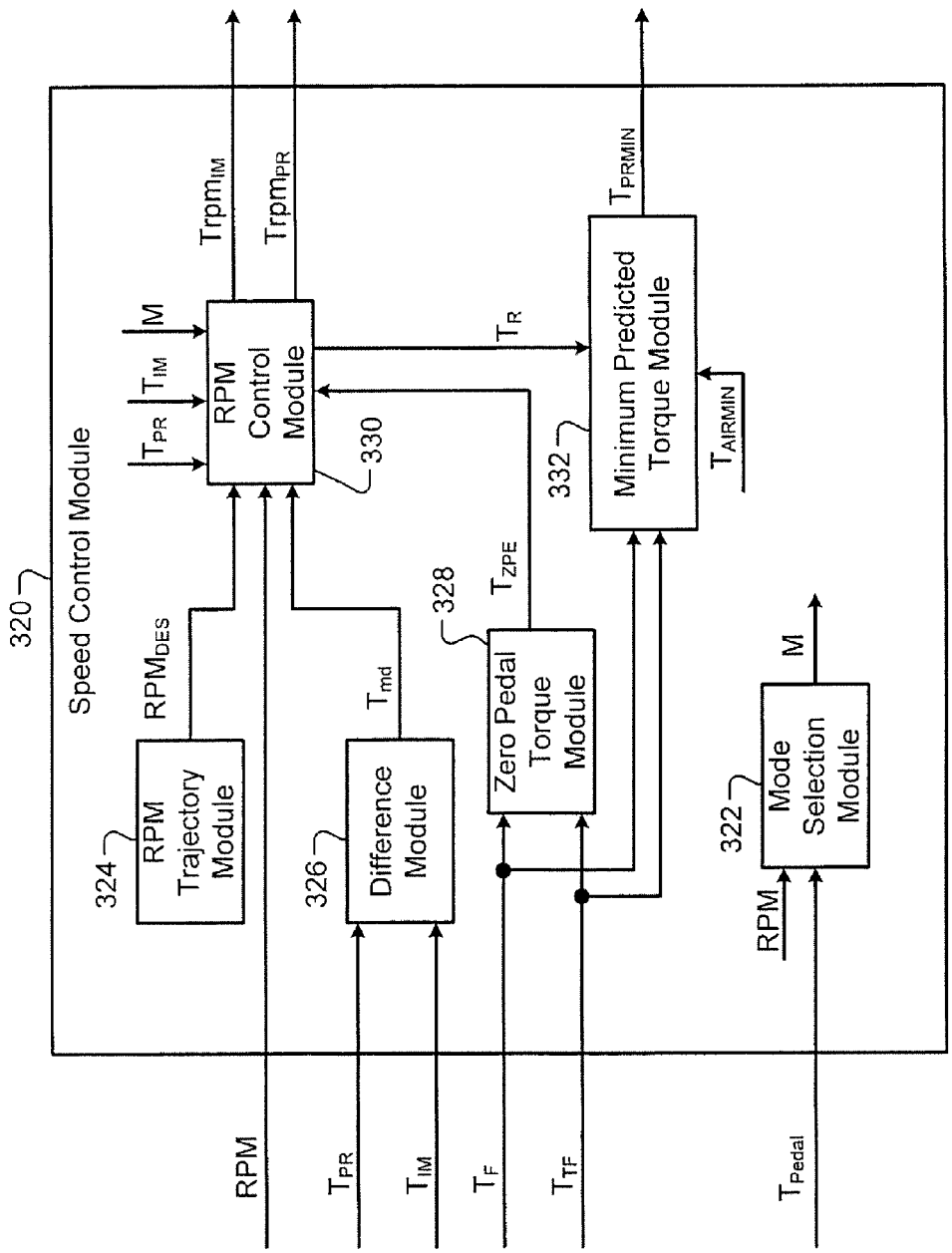
FIG. 4 is a functional block diagram of a speed control module in accordance with an embodiment of the present disclosure.

Referring now also to FIG. 4, a functional block diagram of a speed control module 320 is shown. The speed control module 320 includes a mode selector module 322, a revolutions per minute (RPM) trajectory module 324, a difference module 326, a zero pedal torque module 328, a RPM control module 330, and a minimum predicted torque module 332. The mode selector module 322 generates a mode signal M and may set the operating mode as one of the open loop mode or a feedback control mode, such as the torque control mode or the speed control mode. The mode selection signal 322 is generated based on the engine speed signal RPM and a driver input, such as a pedal torque signal $T_{Ped}$.

The difference module 326 determines a difference between the predicted and immediate torque signals $Trpm_{pr}$, $Trpm_{im}$ or between other predicted and immediate torque signals. The difference module 326 generates a difference signal $T_{md}$ indicating the difference. The zero pedal torque module 328 generates the zero pedal torque signal $T_{ZPE}$ based on the friction torque $T_F$, the transmission load torque $T_{TL}$.

The RPM control module 330 generates the predicted and immediate torque signals $Trpm_{PR}$, $Trpm_{IM}$ and the torque reserve signal $T_R$ based on the mode signal M, the engine speed signal RPM, the zero pedal torque signal $T_{ZPE}$ and a desired engine speed signal $RPM_{Des}$ from the RPM trajectory module. The RPM control module 330 also generates the torque reserve signal $T_R$. The speed control module 320 may generate current predicted and immediate torque signals $Trpm_{PR}$, $Trpm_{IM}$ based on previous predicted and immediate torque signals $Trpm_{PR}$, $Trpm_{IM}$ and/or based on the other predicted and immediate torque signals $T_{PR}$, $T_{IM}$.

The minimum predicted torque module 332 generates a minimum predicted torque signal $T_{PRMIN}$ based on the torque reserve signal $T_R$, the friction torque $T_F$, the transmission load torque $T_{TL}$, and a minimum air torque signal $T_{AIRMIN}$. The minimum air torque signal $T_{AIRMIN}$ may be an air torque when spark is at a maximum spark retard setting. The minimum predicted torque module 332 sums the torque reserve signal $T_R$, the friction torque $T_F$, and the transmission load torque $T_{TL}$ to generate a resultant torque. The minimum predicted torque module 332 compares the resultant torque with the minimum air torque signal $T_{AIRMIN}$ to generate the minimum predicted torque signal $T_{PRMIN}$. The minimum predicted torque signal $T_{PRMIN}$ may be set to the larger of the resultant torque and the minimum air torque signal $T_{AIRMIN}$.

The speed control module 320 may operate in the speed control mode when an engine is operating at an idle speed. The speed control mode is used to adjust an engine speed to or within a predetermined range of a desired engine speed. The speed control module 320 and/or the RPM control module 330 minimizes engine speed error $\Delta N$ using closed loop control, which may include feedback of torque reserve, predicted and immediate values.

The speed control module 320 adjusts the engine speed by controlling torque output of an engine, such as the engine 102. The torque output may be provided using different actuators depending upon the propulsion devices of the engine system. For example, the speed control module 320 when operating in a gasoline-based engine control system may adjust throttle and spark actuators when controlling torque output. As another example, the speed control module 320 when operating in a diesel-based engine control system may adjust fuel injection quantity actuators when controlling torque output. As yet another example, the speed control module 320 when operating in a mild hybrid-based engine control system may adjust state of charge, electric motor, throttle and spark actuators when controlling torque output. State of charge actuators may refer to actuators that adjust charge of a power supply. The speed control module 320 provides a single (common) module that manages engine speed variations irrespective of the type of actuators available for adjusting engine torque output.

The speed control module 320 uses predicted torque requests as a leading torque indicator to control slow actuators, such as the throttle and cam phaser actuators, to adjust air torque $T_{AIR}$. The air torque $T_{AIR}$ is adjusted such that the immediate torque $T_{IM}$ has full authority to control engine speed. In other words, the torque output of the engine follows the immediate torque $T_{IM}$ requests to adjust the engine speed RPM to a desired engine speed RPM The immediate torque $T_{IM}$ may be a current brake torque $BT_{REQ}$ used to control engine speed. The immediate torque $T_{IM}$ may be limited by a minimum torque and the unmanaged torque $T_U$. The unmanaged torque $T_U$ is determined based on actual air torque $T_{AIR}$ delivered to the engine due to manifold delay and a predicted torque request. The unmanaged torque $T_U$ may be set equal to the immediate torque $T_{IM}$ plus the torque reserve $T_R$.

The brake torque $BT_{REQ}$ refers to output torque of the engine at the crankshaft. The brake torque $BT_{REQ}$ may be determined via the propulsion torque arbitration module 506. The brake torque $BT_{REQ}$ at idle is based on transmission temperature, transmission state (e.g., park, neutral or drive states), and idle speed of the engine. The brake torque $BT_{REQ}$ is dependent on the vehicle operator demands (e.g., accelerator pedal position), road surface (e.g. wheel friction) and transmission drive gear when the driver tips in to the pedal (e.g., non-zero accelerator pedal position). The brake torque $BT_{REQ}$ may be determined using equation 2.

$$BT_{REQ} = T_{ped} + T_{IDLE} = T_{ENG} - T_{Acces} \quad (2)$$

$T_{ped}$ is a torque requested based on an accelerator pedal position. $T_{IDLE}$ is idle torque when the accelerator pedal is at a zero position (no tip in from driver), $T_{ENG}$ is torque produced by the engine, and $T_{Acces}$ is torque used by accessories of the engine. Accessory torque $T_{Acces}$ may include power steering torque $T_{PS}$, air conditioning torque $T_{AC}$, alternator/generator torque $T_G$, etc.

For a diesel engine, the throttle is set in a wide open state except for EGR and boost control when the throttle is minimally actuated to create a vacuum. The unmanaged torque $T_U$ is at a high level such that the immediate torque $T_{IM}$ has full authority to control engine speed. The immediate actuator may be fuel quantity FUEL.

For a gasoline engine, the unmanaged torque $T_U$ is dependent on predicted torque $T_{PR}$ and manifold and engine volume ratios. The immediate actuator is spark and/or equivalence ratio. The equivalence ratio is a ratio of a fuel-to-oxidizer ratio to a stoichiometric fuel-to-oxidizer ratio. The unmanaged torque $T_U$ may be set high such that the immediate torque $T_{IM}$ has full authority. For mild hybrid vehicle, the unmanaged torque $T_U$ is not relevant. The immediate actuator may be an electric motor.

Figure 5:
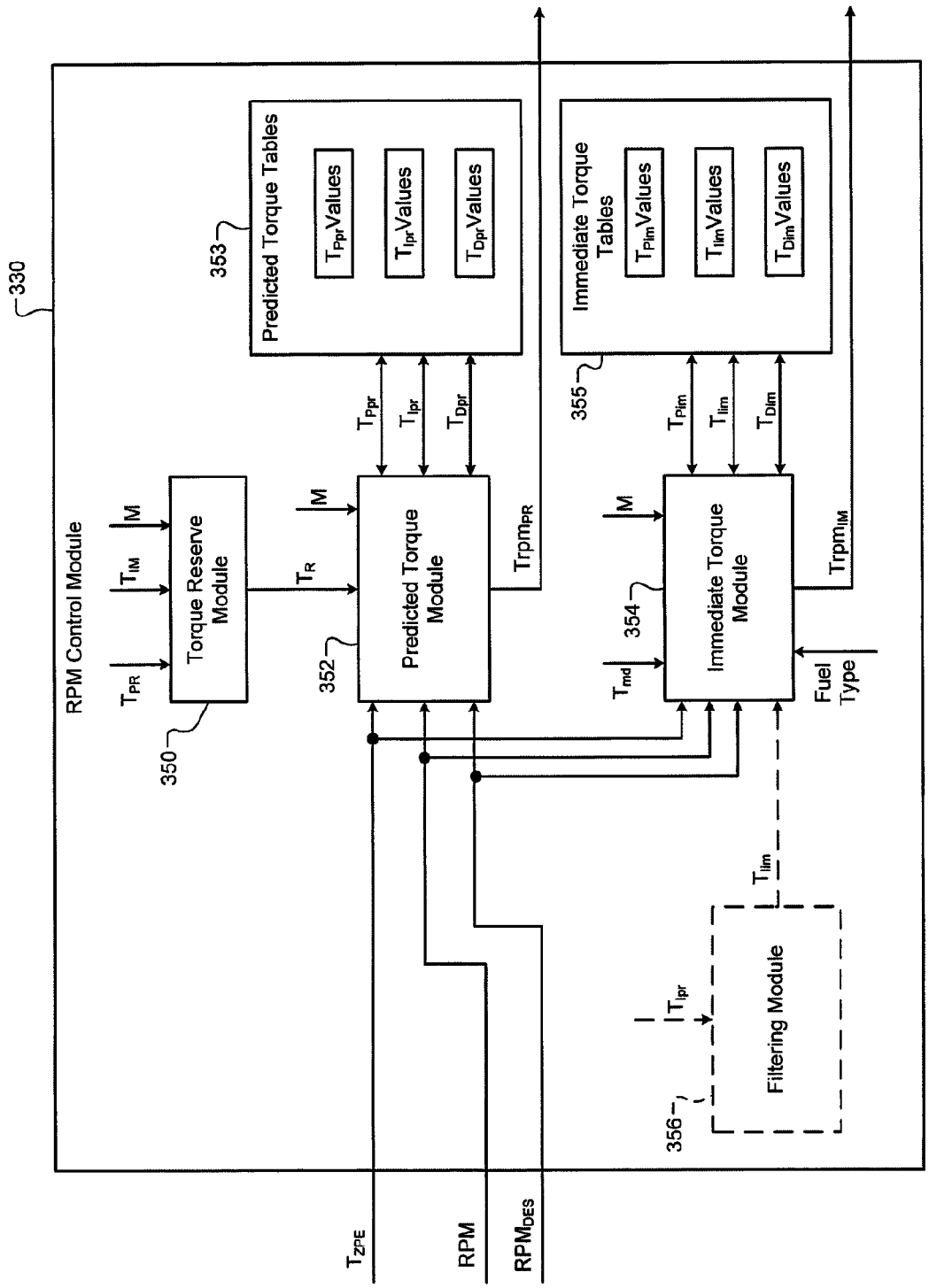
FIG. 5 is a functional block diagram of a revolutions per minute (RPM) control module in accordance with an embodiment of the present disclosure.

In FIG. 5, a functional block diagram of the RPM control module 330 is shown. The RPM control module 330 includes a torque reserve module 350, a predicted torque module 352 and an immediate torque module 354. The torque reserve module 350 generates the torque reserve signal $T_R$ based on predicted and immediate torque signals $T_{PR}$, $T_{IM}$. The predicted and immediate torque signals $T_{PR}$, $T_{IM}$ may be the predicted and immediate torque signals generated by the RPM control module 330 or may be, for example, predicted and immediate torque signals from one of the modules 224, 226, 228, 230, 232.

The predicted torque module 352 generates the predicted torque signal $Trpm_{PR}$ based on the torque reserve signal $T_R$, the zero pedal torque signal $T_{ZPE}$, the current engine speed RPM and the desired engine speed $RPM_{DES}$. The predicted torque module 352 may generate the predicted torque signal $Trpm_{PR}$ based on predicted proportional, integral, and derivative torque values $T_{Ppr}$, $T_{Ipr}$, $T_{Dpr}$. The predicted proportional, integral, and derivative torque values $T_{Ppr}$, $T_{Ipr}$, $T_{Dpr}$ may be stored in one or more predicted torque tables 353 and accessed based on, for example, the an engine speed error. The engine speed error $\Delta N$ is equal to a difference between the current engine speed signal RPM and the desired engine speed signal $RPM_{DES}$.

The immediate torque module 354 generates the immediate torque signal $Trpm_{PR}$ based on the difference signal $T_{md}$, the zero pedal torque signal $T_{ZPE}$, the current engine speed RPM, the desired engine speed $RPM_{DES}$, and a fuel type signal. The fuel type signal may indicate whether the RPM control module is operating in, for example, a gasoline-based application or a diesel-based application. The immediate torque module 354 may generate the immediate torque signal $Trpm_{IM}$ based on immediate proportional, integral, and derivative torque values $T_{Pim}$, $T_{Iim}$, $T_{Dim}$. The immediate proportional, integral, and derivative torque values $T_{Pim}$, $T_{Iim}$, $T_{Dim}$ may be stored in one or more immediate torque tables 355 and accessed based on, for example, the engine speed error.

The immediate torque module 354 generates the immediate torque signal $Trpm_{PR}$ based on the immediate integral torque value $T_{Iim}$ for diesel-based applications. The RPM control module 330 may include a filtering module 356 that filters the predicted integral torque value $T_{Ipr}$ to generate the immediate integral torque value $T_{Iim}$ for gasoline-based applications. The filtering module 356 may low pass filter the predicted integral torque value $T_{Ipr}$ to generate the immediate integral torque value $T_{Iim}$. The immediate torque module 354 may not access the immediate integral torque values $T_{Iim}$ from the immediate torque tables 355 for the gasoline-based applications.

Example transitions between the operating modes of the speed control module 320 are illustrated in the following described plots.

Figure 6:
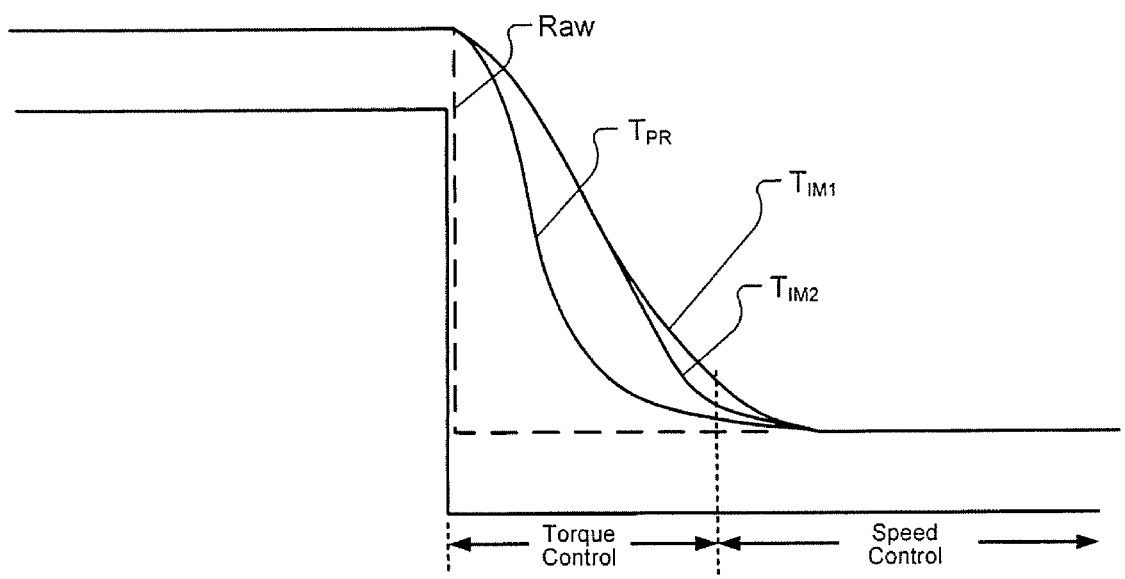
FIG. 6 is a torque plot during a torque-to-speed control transition in accordance with an embodiment of the present disclosure.

In FIG. 6, a torque plot during a torque-to-speed control transition is shown. The CTC control modules 222, 222' and/or the speed control module 320 may transition between the torque control mode and the speed control mode. For example, a transition from the torque control mode to the speed control mode may be performed when a vehicle operator tips-out (releases the gas pedal). In the example shown, a vehicle operator tips-out from a 20% pedal position to a 0% pedal position. Predicted and immediate torque levels (profiles) are adjusted to provide a smooth transition (smooth torque and engine speed changes) between operating modes. A raw torque signal (driver torque request) RAW is shown. If the raw torque signal RAW was provided as the engine output torque the engine would experience a sudden reduction in engine output torque.

Example predicted and immediate torque curves $T_{PR}$, $T_{IM1}$, $T_{IM2}$ are shown to illustrate the smooth transition. The predicted and immediate torque values are gradually decreased after the tip-out (release of accelerator pedal or a zero torque output request). The transition to the speed control mode occurs before the predicted and immediate torque values level off at approximately the zero pedal torque $T_{ZPE}$. The rate of change in the immediate torque may be altered by adjusting, for example, spark, as shown by the immediate torque curves $T_{IM1}$, $T_{IM2}$. The difference between the predicted and immediate torque levels may be "blended over time" to provide the smooth transition. In other words, the difference is gradually decreased over time.

During a transition between the torque control and speed control modes for gasoline-based applications, the integral predicted torque value $T_{Ipr}$ may be initialized such that there is no predicted torque difference before and after the transition. The predicted torque before and after the transition are the same. The integral immediate torque value $T_{Iim}$ may follow the filtered integral predicted torque value $T_{Ipr}$ using a lag filter. The torque difference $T_{md}$ before the transition is decayed over a period of time after the transition. The torque difference $T_{md}$ may be decayed using calibration.

During a transition between torque control and speed control for diesel-based applications, the integral immediate torque value $T_{Iim}$ is initialized such that there is no immediate torque difference before and after the transition. The immediate torque before the transition is equal to the immediate torque after the transition.

Figure 7A:
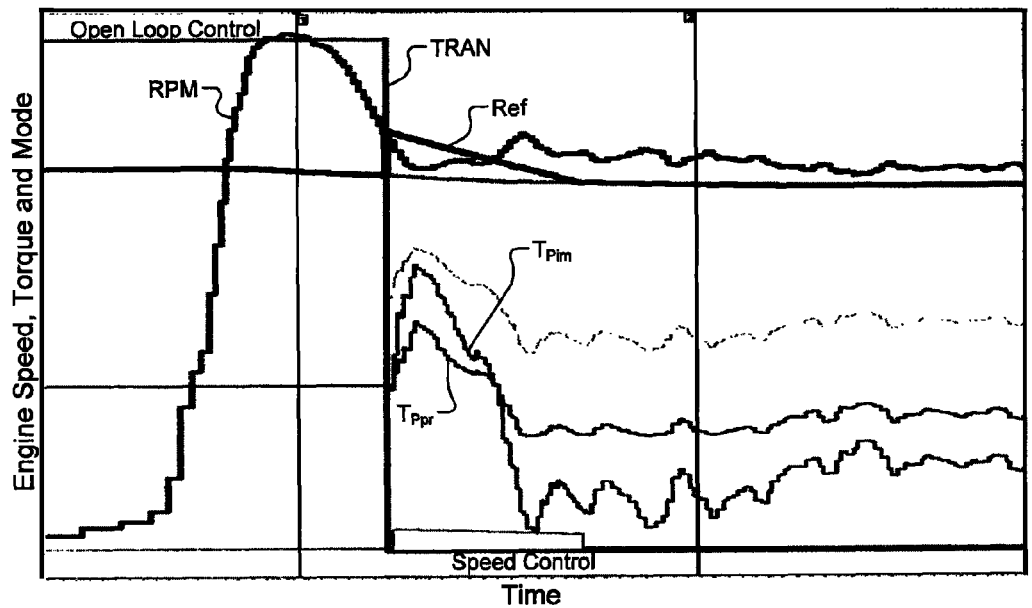
FIG. 7A is a plot of engine speed and predicted and immediate proportional toques during a gasoline-based engine startup in accordance with an embodiment of the present disclosure.

In FIG. 7A, a plot of actual engine speed RPM and predicted and immediate proportional torques $T_{Ppr}$, $T_{Pim}$ during a gasoline-based engine startup is shown. A transition signal TRAN is shown that indicates the mode of operation; either the open loop control mode or the speed control mode and the transition between the open loop control and speed control modes. A reference signal Ref is also shown. The reference signal Ref may be the desired engine speed $RPM_{Des}$. The actual engine speed RPM is increased during the open loop control mode when the engine is started. The actual engine speed RPM settles to an idle speed during the speed control mode. The immediate proportional torques $T_{Ppr}$, $T_{Pim}$ increase after the transition between the open loop mode and the speed control mode and then level off to respective approximately constant levels during the speed control mode, as shown.

After a cold start, the reference signal Ref is initialized based on actual engine speed RPM such that when the actual engine speed RPM decreases the proportional immediate torque value $T_{Pim}$ increases to recover the engine speed. If the reference signal Ref is initialized based on a the desired engine speed $RPM_{Des}$, then the proportional immediate torque values $T_{Pim}$ decrease until the actual engine speed RPM decreases to less than the desired engine speed $RPM_{Des}$. This causes a larger "sag" or reduction for a period of time in engine speed. To prevent this reduction in engine speed, the reference signal Ref is initialized based on actual engine speed RPM.

Figure 7B:
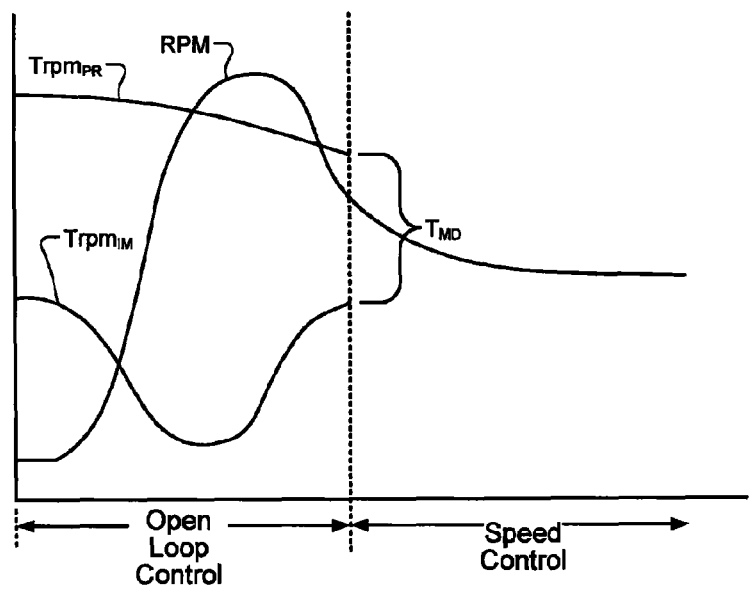
FIG. 7B is a plot of engine speed and predicted and immediate torques during a gasoline-based engine startup in accordance with an embodiment of the present disclosure.

In FIG. 7B, a plot of the actual engine speed RPM and predicted and immediate torques $Trpm_{PR}$, $Trpm_{IM}$ is shown. The predicted torque $Trpm_{PR}$ starts at a high level and gradually decreases during the open loop control mode. The immediate torque $Trpm_{IM}$ starts at a level that is less than that of the predicted torque $Trpm_{PR}$. The immediate torque $Trpm_{IM}$ decreases while the actual engine speed RPM is increases and than increases when the actual engine speed RPM stops increasing and/or decreases. The immediate torque $Trpm_{IM}$ is related to the air torque and for this reason has a profile, as shown. A throttle may be in a partially or fully open position and spark may be retarded during the startup of the engine.

At the transition between the open loop control mode and the speed control mode (closed loop control mode) the difference between the predicted torque $Trpm_{PR}$ and the immediate torque $Trpm_{IM}$ is determined and referred to as the difference signal $T_{md}$. The difference signal Tmd may be gradually reduced to zero during the speed control mode.

Figure 8A:
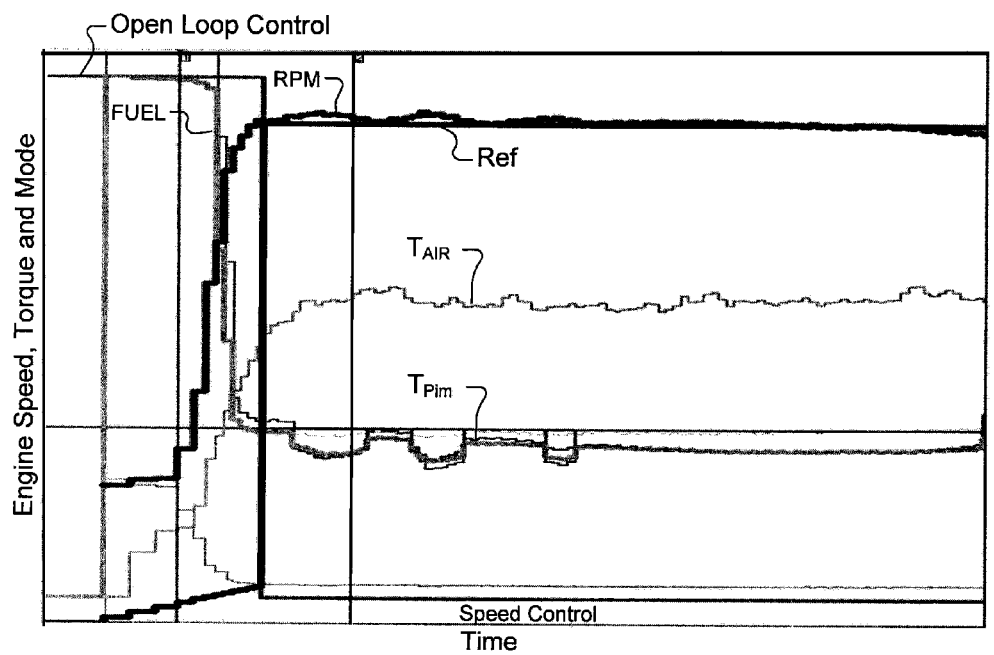
FIG. 8A is a plot of engine speed, fuel, and air torque during a diesel-based engine startup in accordance with an embodiment of the present disclosure.
Figure 8B:
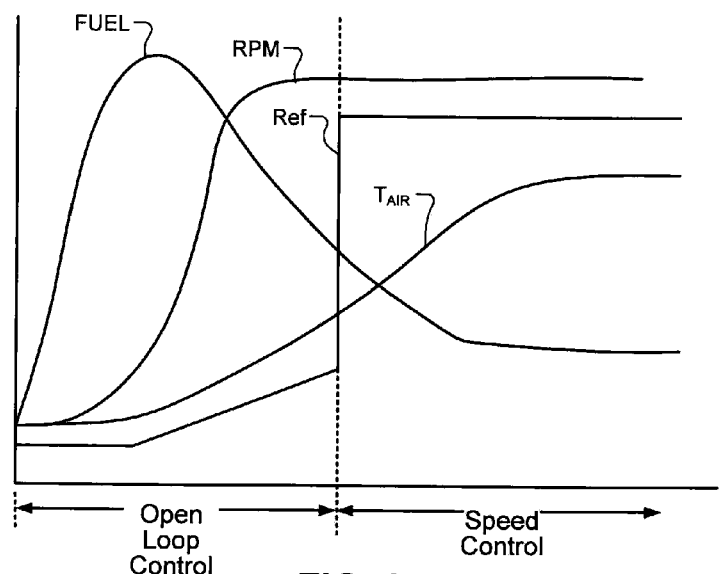
FIG. 8B is another plot of engine speed, fuel, and air torque during a diesel-based engine startup in accordance with an embodiment of the present disclosure.

In FIGS. 8A and 8B, plots of actual engine speed RPM, fuel (fuel quantity), and air torque (or air flow) during a diesel-based engine startup is shown. A reference signal Ref is also shown. The reference signal Ref may be the desired engine speed $RPM_{Des}$. The reference signal indicates the switch between the open loop control mode and the speed control mode. To start the engine, the fuel quantity FUEL is increased during the open loop control mode and then decreased to an approximately constant predetermined level to provide an idle engine speed. The predetermined fuel quantity level is provided during a speed control mode. The actual engine speed RPM is increased during an open loop control mode and lags the increase in the fuel quantity FUEL. The actual engine speed RPM settles at an idle speed during the open loop control mode before the transition between the open loop control mode and the engine speed control mode. The air toque $T_{AIR}$ lags the actual engine speed RPM and increases during the open loop control mode and during the speed control mode to a predetermined air level, as shown.

Figure 9:
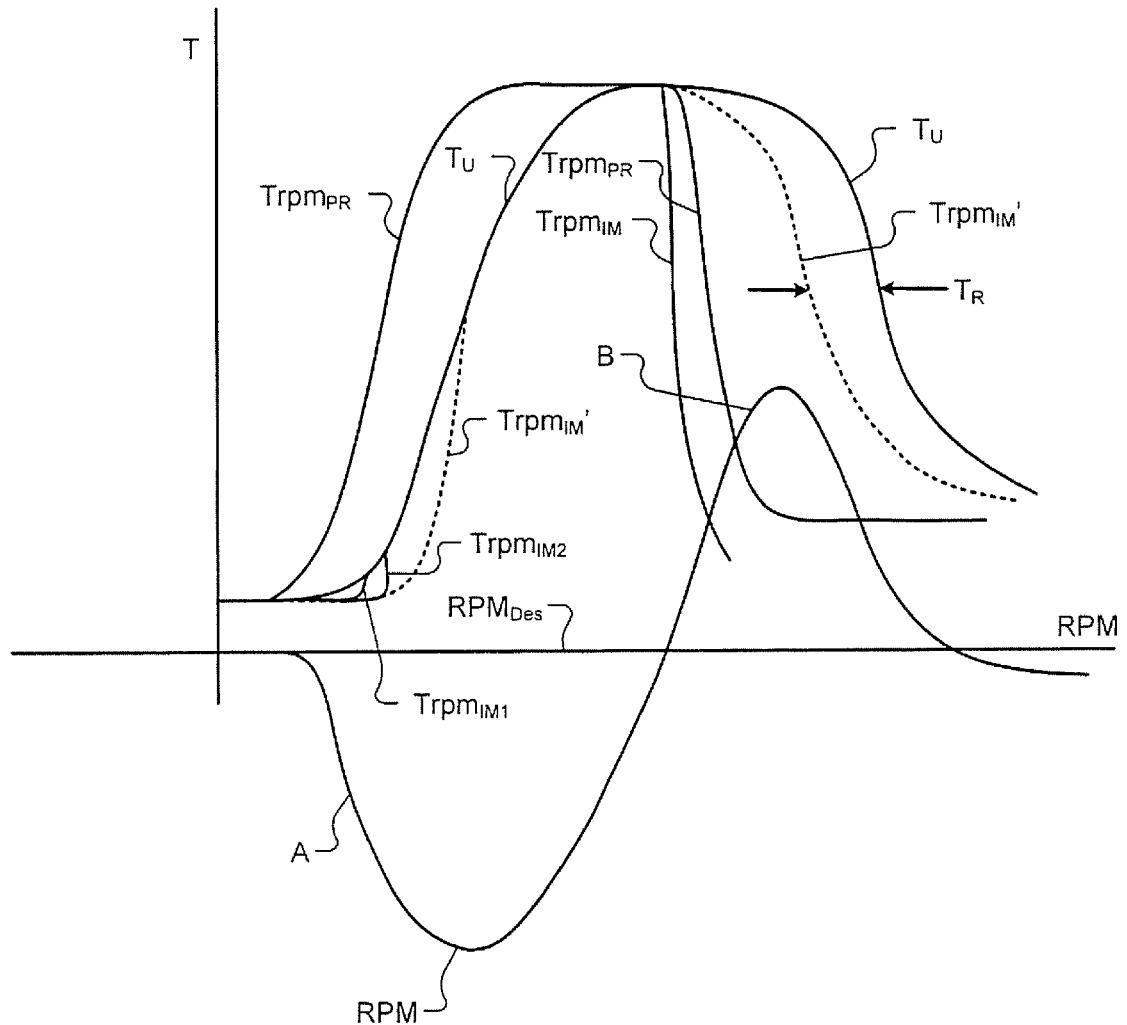
FIG. 9 is a torque plot illustrating torque values due to changes in engine speed in accordance with an embodiment of the present disclosure.

In FIG. 9, a torque plot illustrating torque values due to changes in engine speed is shown. The changes in engine speed may be due to introduction of a load on the engine. The engine speed is initially decreased due to the load and then increased to compensate for the increase in load. The engine speed RPM is shown relative to the desired engine speed $RPM_{Des}$.

In one embodiment, the immediate torque $Trpm_{IM}$ is not based on unmanaged torque $T_U$. As a result, the response time of the immediate torque $Trpm_{IM}$ decreases. This allows the immediate torque $Trpm_{IM}$ to correct for any engine speed error. Put another way, as the unmanaged torque $T_U$ increases, the immediate torque $Trpm_{IM}$ may lag the unmanaged torque $T_U$, but increases up to the unmanaged torque $T_U$ at a quicker rate. The unmanaged torque $T_U$ limiting the immediate torque Trpm$_{IM}$. This is shown by the immediate torque signals Trpm$_{IM1}$, Trpm$_{IM2}$, Trpm$_{IM}$'. The immediate torque signals Trpm$_{IM1}$, Trpm$_{IM2}$ are not based on the unmanaged torque T$_U$. The immediate torque signal Trpm$_{IM}$' is generated based on the unmanaged torque T$_U$. The immediate torque signals Trpm$_{IM1}$, Trpm$_{IM2}$ illustrate that the response time or rate of change may be adjusted. The torque signal Trpm$_{IM2}$ has a slower response time and a reduced rate of change than the torque signal Trpm$_{IM1}$, but both Trpm$_{IM1}$, Trpm$_{IM2}$ have a faster response time compared to Trpm$_{IM}$'.

As another example, as the minimum of the immediate torque Trpm$_{IM}$ is not bounded or limited by the unmanaged torque T$_U$, the immediate torque Trpm$_{IM}$ may decrease at a quicker rate than the unmanaged torque T$_U$, as shown. The immediate torque Trpmd$_{IM}$', which is based on the unmanaged torque T$_U$, decreases quicker than the unmanaged torque T$_U$, but remains within a torque reserve T$_R$ of the unmanaged torque T$_U$. Change in the immediate torque Trpm$_{IM}$' is limited by rate of change in the unmanaged torque T$_U$.

Figure 10:
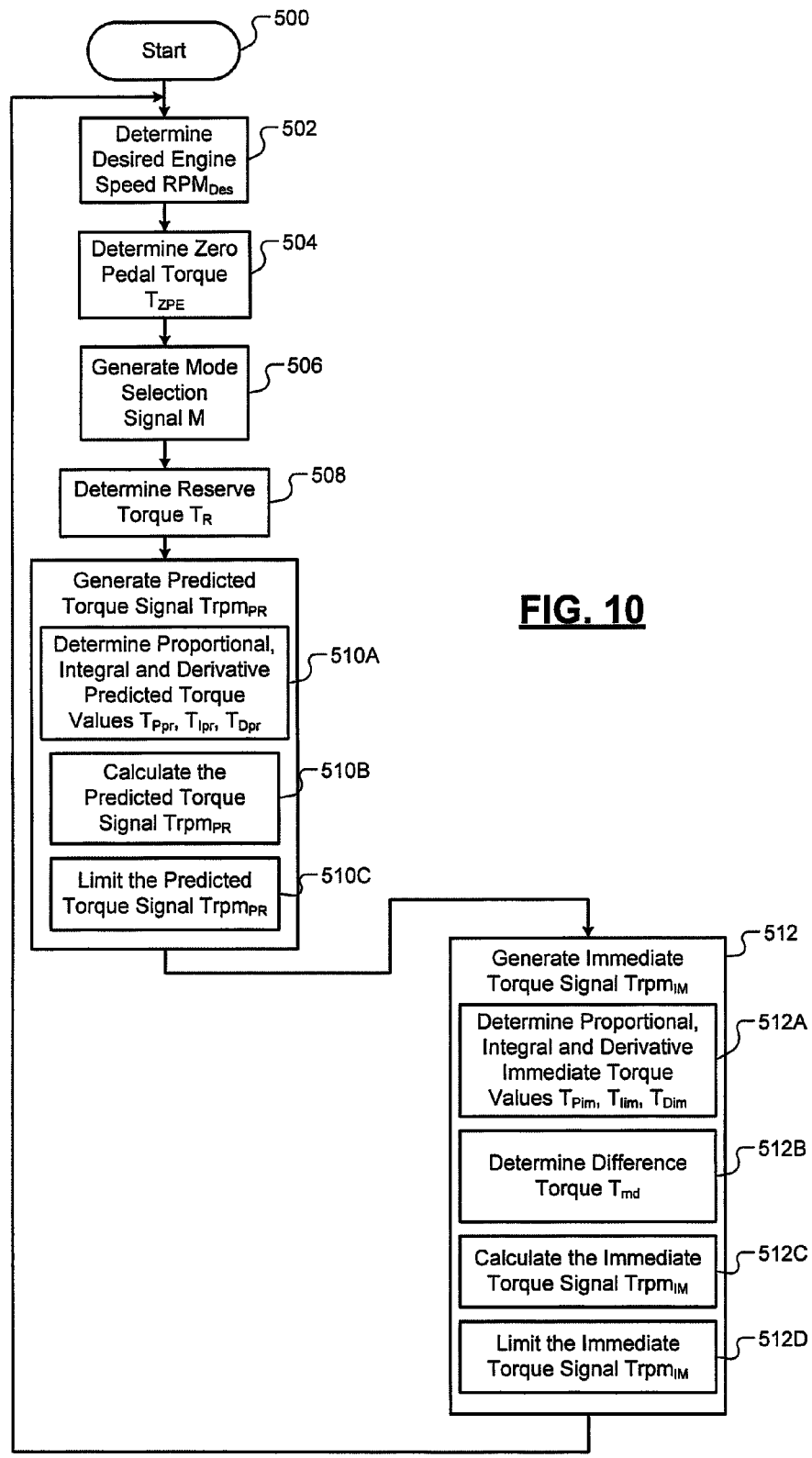
FIG. 10 is a flow diagram illustrating a method of performing speed control of an internal combustion engine in accordance with an embodiment of the present disclosure.

In FIG. 10, a flow diagram illustrating a method of performing speed control of an internal combustion engine is shown. Although the following steps are described primarily with respect to FIGS. 1-5, the method may be applied to other embodiments of the present disclosure. The method may begin at 500.

The following steps and examples are performed based on equations 3-14. As a first example, equations 3, 4 and 8-10 may be used. In a second example, and to provide a quicker response time, equations 5, 6, and 11 are used. In the second example, equation 7 may be used for gasoline-based applications. The flow diagram of FIG. 10 illustrates the second example. Trpm$_{PR}$ is the predicted torque request. Trpm$_{IM}$ is the immediate torque request. T$_{ZPE}$ is the zero pedal torque request. T$_{AIRACT}$ is the actual air torque. T$_{PRCOMM}$ is the commanded predicted torque. T$_{ERR}$ is the error torque. T$_{PRACT}$ is the actual predicted torque. At steady state, the torque values T$_{Ppr}$, T$_{Dpr}$, T$_{Pim}$, T$_{Dim}$, T$_{md}$ are equal to zero and the integral predicted torque value T$_{Ipr}$ is equal to the filtered integral predicted torque value F(T$_{Ipr}$). f{ΔN} refers to a function of engine speed error or function of a difference between the actual engine speed RPM and the desired engine speed RPM$_{Des}$. K$_D$ is a derivative constant, which may be determined from a table based on the ΔN. ΔRPM is a rate of change in engine speed.

$$Trpm_{PR} = T_{ZPE} + T_R + T_{Ppr} + T_{Ipr} \quad (3)$$

$$Trpm_{IM} = T_{AIRACT} - T_R + T_{Pim} \quad (4)$$

$$Trpm_{PR} = T_{ZPE} + T_R + T_{Ppr} + T_{Ipr} + T_{Dpr} \quad (5)$$

$$Trpm_{IM} = T_{ZPE} + T_{lim} + T_{Pim} + T_{Dim} + T_{md} \quad (6)$$

$$T_{lim} = F(T_{Ipr}) \quad (7)$$

$$T_{AIRACT} = T_{PRCOMM} + T_{ERR} \quad (8)$$

$$T_{ERR} = T_U - T_{PRACT} \quad (9)$$

$$T_R = T_U - T_{IM} \quad (10)$$

$$T_R = |T_{PR} - T_{IM}| \quad (11)$$

$$T_{Ppr} = f\{\Delta N\} \quad (12)$$

$$T_{Ipr} = \sum_{x=0}^{x} T_{Ipr} \cdot f\{\Delta N\} \quad (13)$$

$$T_{Dpr} = \Delta RPM \cdot K_D \quad (14)$$

At 502, the RPM trajectory module 324 generates the desired speed signal RPM$_{DES}$. At 504, the zero pedal torque module 328 generates the zero pedal torque signal T$_{ZPE}$. At 506, the mode selection module 322 generates the mode selection signal M. At 508, the torque reserve module 350 determined the actual or final torque reserve signal T$_R$. For the first example, the torque reserve T$_R$ may be determined using equation 10. For the second example, the torque reserve T$_R$ may be determined using equation 11. The torque reserve T$_R$ may be set equal to a difference between the predicted and immediate torques.

At 510, the predicted torque module 352 generates the predicted torque signal Trpm$_{PR}$ based on the mode signal M. As part of the first example, the predicted torque signal Trpm$_{PR}$ may be calculated as shown by equation 3. As part of a second example, the predicted torque signal Trpm$_{PR}$ may be calculated as shown by 5. The predicted torque module 352 may generate the predicted torque signal Trpm$_{PR}$ using one of equations 3 and 5 when the mode signal indicates that the corresponding CTC control module 222, 222', the speed control module 320 and/or the RPM control module 330 are operating in the speed control mode.

At 510A, the proportional, integral and derivative predicted torque values T$_{Ppr}$, T$_{Ipr}$, T$_{Dpr}$ are determined. For example only, the proportional, integral and derivative predicted torque values T$_{Ppr}$, T$_{Ipr}$, T$_{Dpr}$ may be determined using equations 12-14. At 510B, the zero pedal torque signal T$_{ZPE}$, the torque reserve T$_R$, and the proportional, integral and derivative predicted torque values T$_{Ppr}$, T$_{Ipr}$, T$_{Dpr}$ are summed to generate the predicted torque signal Trpm$_{PR}$ (according to equation 5).

At 510C, the predicted torque Trpm$_{pr}$ may be limited. The predicted torque Trpm$_{PR}$ may have a first maximum limit that is set equal to a first predetermined maximum security limit. The predicted torque Trpm$_{PR}$ may have a first minimum limit that is set equal to the greater of a first minimum combustion air torque and a sum of the engine friction torque T$_F$, the transmission load torque T$_{TL}$ and the reserve torque T$_R$. The RPM control module 330 and/or the predicted torque module may ramp the proportional and derivative predicted torque values T$_{Ppr}$, T$_{Dpr}$ to zero for gasoline-based applications. The integral predicted torque value T$_{Ipr}$ may be reset during the mode transition and when either minimum or maximum limit is reached. The proportional and derivative predicted torque values T$_{Ppr}$, T$_{Dpr}$ may be ramped to zero and the integral predicted torque value T$_{Ipr}$ may be reset when the predicted torque Trpm$_{pr}$ is equal to the first maximum limit or the first minimum limit. The integral predicted torque value T$_{Ipr}$ may be reset such that the final (actual) predicted torque is equal to one of the first maximum limit and the first minimum limit.

At 512, the immediate torque module 354 generates the immediate torque signal Trpm$_{IM}$ based on the mode signal M. As part of the first example, the immediate torque signal Trpm$_{IM}$ may be calculated as shown by equation 4. As part of a second example, the immediate torque signal Trpm$_{IM}$ may be calculated as shown by 6. The immediate torque module 354 may generate the predicted torque signal Trpm$_{IM}$ using one of equations 4 and 6 when the mode signal indicates that the corresponding CTC control module, the speed control module and/or the RPM control module are operating in the speed control mode. The predicted torque signal Trpm$_{IM}$ may be calculated as shown by one of equations 4 and 6. Equation 6 is used for quicker response time. Unlike equation 4, equation 6 is not dependent on the unmanaged torque $T_U$. Thus, in one embodiment equations 5 and 6 are used, as opposed to equations 3 and 4.

At 512A, the proportional, integral and derivative immediate torque values $T_{Pim}$, $T_{Iim}$, $T_{Dim}$ are determined. The integral immediate torque value $T_{Iim}$ may be set equal to the integral predicted torque value $T_{Ipr}$ filtered for gasoline-based applications. The integral predicted torque value $T_{Ipr}$ may be filtered using a low pass filter having, for example, a filter coefficient of 0.4. A smaller filter coefficient, such as 0.1, may be used to increase lag time. At 512B, the difference module determines the difference torque $T_{md}$. At 512C, the zero pedal torque signal $T_{ZPE}$, the difference torque $T_{md}$, the torque reserve $T_R$, and the proportional, integral and derivative immediate torque values $T_{Pim}$, $T_{Iim}$, $T_{Dim}$ are summed to generate the immediate torque signal $Trpm_{IM}$ (according to equation 6). Thus, the immediate torque signal $Trpm_{IM}$ is generated independent of the unmanaged torque $T_U$.

At 512D, the immediate torque signal $Trpm_{im}$ may be limited. The immediate torque signal $Trpm_{im}$ may have a second maximum limit that is set equal to the lesser of the unmanaged torque $T_U$ and a second predetermined maximum security limit. The immediate torque $Trpm_{im}$ may have a second minimum limit that is set equal to the engine friction torque $T_F$ or a fuel cutoff torque $T_{cutoff}$ for diesel-based applications. The integral immediate torque value $T_{Iim}$ may be reset, for example, to zero for diesel-based applications. The integral immediate torque value $T_{Iim}$ may be reset when the immediate torque signal $Trpm_{im}$ is equal to one of the second maximum limit and the second minimum limit. The integral immediate torque value $T_{Iim}$ may be reset, such that the final (actual) immediate torque signal $Trpm_{im}$ is equal to one of the second maximum limit and the second minimum limit.

The second minimum limit may be set equal to a minimum spark torque $T_{SparkMin}$ for gasoline-based applications. The minimum spark torque $T_{SparkMin}$ refers to a torque level at a maximum spark retard.

The results of steps 510 and 512 may be used for gasoline-based applications. The results of Step 510 may not be used for diesel-based applications. The results of step 512 may be used for diesel-based applications. The speed control module may return to step 502 after step 512.

The above-described steps are meant to be illustrative examples; the steps may be performed sequentially, synchronously, simultaneously, continuously, during overlapping time periods or in a different order depending upon the application.

The above-described embodiments provide a speed control algorithm, module and method that decreases reaction time due to engine speed disturbances relative to torque control-based systems. The speed control algorithm, module and method also reduces torque reserve levels and hence improves fuel economy. The engine speed control algorithm, module and method provides combustion stability, reduced emissions, improved fuel economy and shift management between torque control, open-loop control and speed control modes.

The above-described embodiments, abstract away from actuators and response signals of actuators and instead controls based on desired engine speed. Engine speed feedback is used instead of a torque control system feedback, such as the actual air torque or unmanaged torque. A single set of software instructions may be used based on the described embodiments for gasoline and diesel engines. Fuel economy is reduced through reduced idle speed reserve due to decreased reaction times.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a mode selection module that is configured to select an operating mode from one of an open loop control mode, a torque control mode, and a speed control mode based on an engine speed and a driver input;
an axle torque arbitration (ABA) module that generates ABA predicted and immediate torque requests based on the driver input;
a speed control (SC) module that generates a first set of SC predicted and immediate torque requests based on engine speed;
a propulsion torque arbitration (PTA) module that generates PTA predicted and immediate torque requests based on one of the ABA predicted and immediate torque requests and the first set of SC predicted and immediate torque requests based on the operating mode;
a torque output control module that controls output torque of an engine based on the PTA predicted and immediate torque requests; and
a zero pedal torque module that generates a zero pedal torque signal based on a friction torque and a transmission load torque; and
a revolutions per minute (RPM) control module that generates a second set of SC predicted and immediate torque requests based on the zero pedal torque signal.

2. The engine control system of claim 1, wherein the speed control (SC) module generates the SC predicted and immediate torque requests based on a second set of SC predicted and immediate torque requests.

3. The engine control system of claim 2, wherein the speed control (SC) module generates the SC predicted and immediate torque requests based on predicted and immediate torque requests other than the first set of SC predicted and immediate torque requests.

4. The engine control system of claim 1, wherein the speed control module comprises:
a trajectory module that generates a desired engine speed signal; and
a difference module that generates a difference signal based on the first set of SC predicted and immediate torque requests,
wherein the RPM control module generates a second set of SC predicted and immediate torque requests based on the desired engine speed signal and the difference signal.

5. The engine control system of claim 4, wherein the RPM control module generates the second set of SC predicted and immediate torque requests based on the first set of SC predicted and immediate torque requests.

6. The engine control system of claim 4, further comprising a minimum predicted torque module that generates a minimum predicted torque signal,
wherein:
the RPM control module generates a torque reserve signal based on the first set of SC predicted and immediate torque requests; and
minimum predicted torque module generates the minimum predicted torque signal based on the torque reserve signal and a minimum air torque.

7. The engine control system of claim 4, wherein the RPM control module comprises:

a torque reserve module that generates a torque reserve signal;

a predicted torque module that generates SC predicted torque signals based on the engine speed, the torque reserve signal, the desired engine speed signal, and the zero pedal torque signal; and an immediate torque module that generates SC immediate torque signals based on the engine speed, the desired engine speed signal, the difference signal and the zero pedal torque signal independent of unmanaged torque.

8. The engine control system of claim 7, wherein:

the predicted torque module generates the SC predicted torque signals based on proportional predicted torque values, integral predicted torque values and derivative predicted torque values; and the immediate torque module generates the SC immediate torque signals based on proportional immediate torque values, integral immediate torque values and derivative immediate torque values.

9. The engine control system of claim 8, further comprising a filtering module that generates the integral immediate torque values based on the integral predicted torque values.

10. The engine control system of claim 8, wherein the immediate torque module generates the SC immediate torque signals based on:

the integral predicted torque values when a fuel type signal indicates a gasoline-based application; and the integral immediate torque values when the fuel type signal indicates a diesel-based application.

11. A method of operating an engine control system comprising:

selecting an operating mode from one of an open loop control mode, a torque control mode, and a speed control mode based on an engine speed and a driver input;

generating axle torque arbitration (ABA) predicted and immediate torque requests based on the driver input;

generating a first set of speed control (SC) predicted and immediate torque requests based on engine speed;

generating propulsion torque arbitration (PTA) predicted and immediate torque requests based on one of the ABA predicted and immediate torque requests and the first set of SC predicted and immediate torque requests based on the operating mode;

controlling output torque of an engine based on the PTA predicted and immediate torque requests; generating a zero pedal torque signal based on a friction torque and a transmission load torque; and generating a second set of SC predicted and immediate torque requests based on the zero pedal torque signal.

12. The method of claim 11, wherein the SC predicted and immediate torque requests are generated based on a second set of SC predicted and immediate torque requests.

13. The method of claim 12, wherein the SC predicted and immediate torque requests are generated based on predicted and immediate torque requests other than the first set of SC predicted and immediate torque requests.

14. The method of claim 11, further comprising:

generating a desired engine speed signal;

generating a difference signal based on the first set of SC predicted and immediate torque requests; and generating the second set of SC predicted and immediate torque requests based on the desired engine speed signal and the difference signal.

15. The method of claim 14, wherein the second set of SC predicted and immediate torque requests are generated based on the first set of SC predicted and immediate torque requests.

16. The method of claim 14, further comprising:

generating a minimum predicted torque signal; and generating a torque reserve signal based on the first set of SC predicted and immediate torque requests, wherein the minimum predicted torque signal is generated based on the torque reserve signal and a minimum air torque.

17. The method of claim 14, further comprising:

generating a torque reserve signal;

generating SC predicted torque signals based on the engine speed, the torque reserve signal, the desired engine speed signal, and the zero pedal torque signal; and generating SC immediate torque signals based on the engine speed, the desired engine speed signal, the difference signal and the zero pedal torque signal independent of unmanaged torque.

18. The method of claim 17, wherein:

the SC predicted torque signals are generated based on proportional predicted torque values, integral predicted torque values and derivative predicted torque values; and the SC immediate torque signals are generated based on proportional immediate torque values, integral immediate torque values and derivative immediate torque values.

19. The method of claim 18, further comprising filtering the integral predicted torque values to generate the integral immediate torque values.

20. The method of claim 18, wherein the SC immediate torque signals are generated based on:

the integral predicted torque values when a fuel type signal indicates a gasoline-based application; and the integral immediate torque values when the fuel type signal indicates a diesel-based application.

* * * * *